Figure 7:
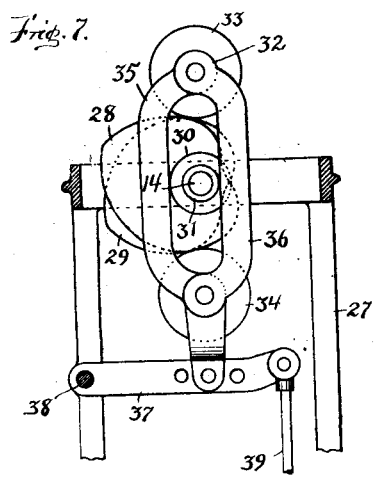

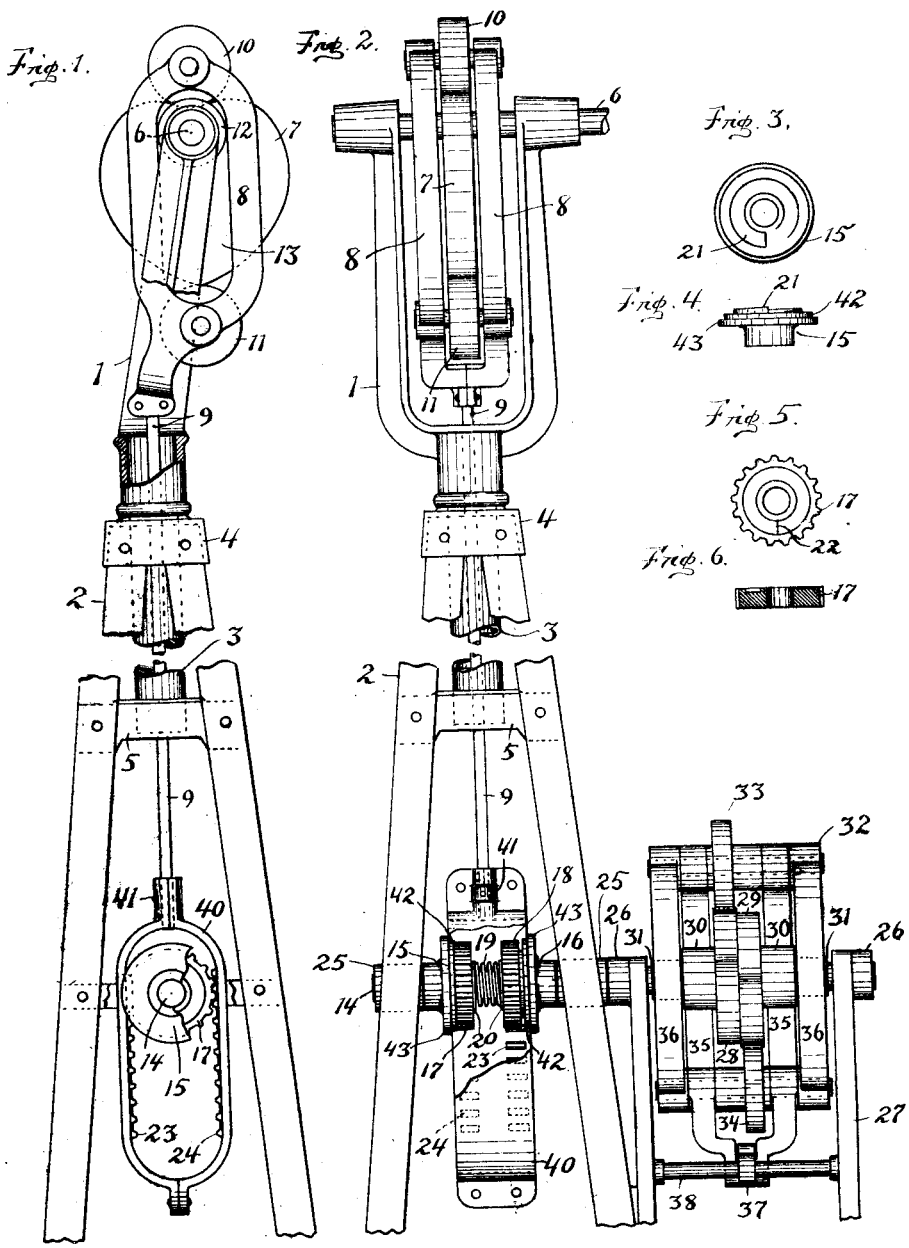

M. C. NIXON.
MECHANISM FOR CONVERTING MOTION.
APPLICATION FILED FEB. 13, 1904.

1,050,226.

Patented Jan. 14, 1913.
2 SHEETS—SHEET 2.

WITNESSES:

INVENTOR
Moses C. Nixon

UNITED STATES PATENT OFFICE.

MOSES C. NIXON, OF PERU, INDIANA.

MECHANISM FOR CONVERTING MOTION.

1,050,226.  Specification of Letters Patent.  Patented Jan. 14, 1913.

Application filed February 13, 1904. Serial No. 193,369.

*To all whom it may concern:*

Be it known that I, MOSES C. NIXON, a citizen of the United States, residing at Peru, in the county of Miami and State of Indiana, have invented certain new and useful Improvements in Mechanism for Converting Motion, of which the following is a specification, reference being had to the accompanying drawings, and to the figures of reference marked thereon, which form part hereof.

The present invention relates to improvements in mechanism for transmitting motion, and consists, preferably, in the construction hereinafter described, which may be varied without departing from the spirit of my invention.

In the drawings Figure 1 is a rear elevation of my wind-mill, with parts cut away, and partly in central section; Fig. 2 is an elevation of the same at right angles to that of Fig. 1, and with parts cut away, and showing also in connection therewith a device for transforming rotary motion into reciprocating motion; Fig. 3 is a plan of one of the clutch collars; Fig. 4 is a side view of Fig. 3; Fig. 5 is a plan of one of the clutch pinions; Fig. 6 is a sectional view of Fig. 5 in a plane at right angles thereto; Fig. 7 is an elevation of the device above mentioned for transforming rotary motion into reciprocating motion, shown in a plane at right angles to that of Fig. 2.

The vane, governing mechanism, and the wind-wheel are omitted from the drawings.

Similar numerals of reference indicate corresponding parts throughout the several views, and referring now to the same:

1 is the supporting frame, and 2 is the tower upon which the said frame is movably mounted. A tubular mast 3 depends from said frame and extends through the chair 4 and step 5 of the tower. The power-shaft 6 is journaled in the frame 1 and has rigidly fixed thereon a cam 7. 8 is a following member carrying at its lower end a driving-rod 9 which extends down through said mast into the tower. The said member 8 has mounted in connection therewith rollers 10 and 11 which ride, respectively, upon the upper and lower sides of the said cam. Annular sleeves 12 are arranged upon the shaft 6 and extend in the elongated openings 13 in said member 8. When the cam is rotated, the following member 8 will be vertically reciprocated and the driving-rod 9 will be accordingly actuated. The purpose of the sleeves 12 is to afford rolling bearings upon which the member 8 may bear when it tends to move in either lateral direction, the tendency being due to the effect of the cam upon said member when driving the same.

In the lower part of the tower is mounted a revoluble, horizontal driven shaft 14, upon which are rigidly fixed oppositely disposed clutch collars 15 and 16, each of which is adapted to be engaged, and driven, respectively, by suitable corresponding clutch-pinions 17 and 18 which are loosely mounted upon the shaft 14 adjacent said collars. Upon said shaft 14, between said pinions, is arranged a spring 19 which has attached to its respective ends the washers 20, the latter being held against the respective pinions. The purpose of the spring is to press the said pinions toward said collars. The clutch-teeth 21 on said collars (shown in Figs. 3 and 4), and the corresponding clutch-teeth 22 on said pinions (shown in Fig. 5), are arranged so that when either of said pinions is driven, for example, to the right, the corresponding collar will become engaged by the said pinion and the shaft 14 will thereby be driven accordingly, and when either of said pinions is rotated to the left, said clutch-teeth will become disengaged, thus the collars will be driven in one direction only. The purpose of the washers 20 is to prevent the spring from cutting or wearing the pinions because of the friction. The collars 15 and 16 have annular shoulders 42 which are of slightly greater diameter than the clutch-pinions, and afford bearings upon which the frame 40 may ride, and adjacent said shoulders are guide-flanges 43 which range respectively, upon the sides of the frame 40. The shoulders 42 and flanges 43 prevent the frame 40 from shifting horizontally which would cause derangement of the mechanism. While I have shown a spring arranged to hold the clutch-pinions 17 and 18 into engagement with the collars 15 and 16, such construction may be easily altered without materially changing the idea of the invention, or the result. A movable frame 40 is connected to the lower end of the driving-rod 9 by means of a swivel-joint 41, and ranges astride said shaft 14 and pinions 17 and 18. Toothed racks 23 and 24 are arranged, respectively, upon the opposite inner faces of said frame 40, and mesh with said pinions 18 and 17 respectively. It is the intention that, when the frame 40 is reciprocated vertically, said pinions will be rotated in relative opposite directions.

Example: During the upward stroke of the frame 40, the pinion 17 will rotate toward the left and the pinion 18 toward the right, and vice versa during the downward stroke of said frame. It should, therefore, appear that the shaft 14 will be driven alternately by said pinions, but in each instance in the same direction when the respective pinions travel toward the right. When one pinion rotates toward the right and is in driving engagement with its respective collar, the opposite pinion rotates toward the left and, because of the arrangement of the clutch-teeth and the give of the spring 19, it drifts from engagement with its collar and travels idly upon said shaft. It is obvious that the extent of movement of the shaft 14 compared with that of the driving-rod 9 may be varied directly by decreasing the diameter of the pinions 17 and 18, and inversely by increasing their diameters.

By the use of a reciprocating driving-rod swiveled to the frame 40, I have avoided the objection which occurs where a vertical rotating shaft is used to transmit motion from the source of power to the mechanism to be driven thereby at the lower part of the tower, the objection being the tendency of the wind-wheel to move out of the wind because of the torque of the said vertical shaft. I have also avoided the difficulty due to mechanisms having "dead-centers", or which operate only when driven in one certain direction.

It is by the use of a reciprocal driving-rod connection between the source of power and the driven shaft 14 that it becomes practicable to arrange the gearing at the lower end of the tower, and this is a feature of my invention, rather than the particular form of mechanism by which motion is imparted to the reciprocal driving-rod, so long as the motion imparted is uniform, or the particular connection between said driving-rod and the shaft 14, through which the latter is rotated. By arranging the gearing at the lower part of the tower instead of at the top, as is ordinarily the case, the parts in need of most frequent lubrication and attention, are thereby made easily accessible.

The shaft 14 is supported in bearings 25 carried by the tower, and extends also through bearings 26 carried by the frame 27 which is arranged in juxtaposition with the tower. Upon the shaft 14, within the frame 27, are rigidly mounted two cams, 28 and 29 respectively. The said cams are formed with short and long sides and range in reversed positions, for instance: When in the position shown in Fig. 7, the short side of the cam 28 is uppermost, and the similar side of the cam 29 is lowermost, and the long sides of said cams, of course, are relatively the reverse. Adjacent said cams, upon said shaft 14 are mounted sleeves 30 and 31 respectively, the said sleeves 30 being of larger diameter than the sleeves 31. A movable frame or following member 32 is arranged in operating connection with said cams, and has a roller 33 mounted in its upper part which rides upon the cam 28, and a similar roller 34 mounted in its lower part which rides against the cam 29. The following member 32 consists of the guides 35 and 36 which range astride the shaft 14 and are adapted to rest against and move upon the said sleeves 30 and 31 respectively. The cams 28 and 29 are relatively arranged upon the shaft 14 so that when the roller 33 is at the innermost position respecting the cam 28, the other roller 34 will be at the outermost point of the cam 29, and vice versa. As the said cams have short and long sides, it will be understood that the reciprocal motion imparted to the member 32 by said cams will be differential.

Example: When the said cams rotate toward the left, the downward stroke of the member 32 will be made during a less portion of the revolution of said cams as compared with the upward stroke, and vice versa.

A feature of this invention is the arrangement of the sleeves 30 and 31 and the part they perform in connection with the guides 35 and 36. It may be noted that the pressure of the said cams against the rollers 33 and 34, in driving the said member 32, is such as to cause the said member to tend laterally respecting the shaft 14. For instance: When the said cams rotate toward the left, the member 32 will tend toward the right during the downward stroke thereof causing the guides 35 to bear against the sleeves 30; and toward the left during the upward stroke causing guides 36 to bear against the sleeves 31. As the downward stroke is made during a less portion of the revolution of said cams than during the upward stroke, as hereinbefore stated, I have discovered that it is desirable that, to prevent friction between the sleeves 30 and 31 and the respective guides 35 and 36, the said sleeves should be of such circumference as will afford surface movement compatible with the movement of the said guides which move respectively upon said sleeves, hence, the diameters of the sleeves 30 are made greater than the sleeves 31. The downward and upward strokes of the member 32 are at different velocities, and in order to compensate for this variation in the movement of the member 32 the circumferences of the sleeves are proportioned accordingly, the sleeves of greater circumferences acting upon the corresponding guides during the rapid movement of the member and the sleeves of lesser circumferences acting upon their guides during the slower movement.

I have described a particular form of cam for use in reciprocating the member 32, although other forms of cam or other devices may be employed to give motion to said member. An essential part, however, lies in the particular relation of said sleeves to the guides bearing thereon, the idea being to make each of said sleeves of such respective diameters as will afford circumferential surface-travel equal to the surface-movement of the guides bearing respectively thereon.

The following member is arranged in adjustable connection with a lever 37 which is mounted to swing upon a shaft 38 carried by the frame 27, and a pump-rod 39 is adjustably attached to said lever whereby motion may be transmitted to a pump or any other suitable mechanism to be actuated thereby.

What I claim is:

1. A mechanism of the class described, a rotary shaft, a following member, means in connection with said shaft and following member to actuate the latter, and rolling bearings for said following member rotating with the shaft, the circumferences of said bearings being so proportioned that their contacting surfaces will travel at approximately the same speed as the following member.

2. A mechanism of the class described, a rotary shaft, a following member, means secured to said shaft and arranged to actuate the following member, and sleeves carried by said shaft, rotating therewith and affording rolling bearings for the following member, the circumferences of said sleeves being so proportioned that their contacting surfaces will travel at approximately the same speed as the following member.

3. A mechanism of the class described, a rotary shaft, a following member, a member on said shaft to actuate said following member, mechanism actuated by said following member, and rolling bearings for said following member rotating with the shaft, the circumferences of said bearings being so proportioned that their contacting surfaces will travel at approximately the same speed as the following member.

4. A mechanism of the class described, a revoluble shaft, a following member, a cam secured to said shaft and arranged to reciprocate the following member, and rolling bearings for said following member rotating with the shaft, the circumferences of said bearings being so proportioned that their contacting surfaces will travel at approximately the same speed as the following member.

In testimony whereof I affix my signature, in presence of two witnesses.

MOSES C. NIXON.

Witnesses:
  W. G. BURNS,
  R. C. J. ARANTZ.